Dec. 31, 1940.    A. KRIEG ET AL    2,226,533
LEVEL CONTROL VALVE
Filed April 30, 1938
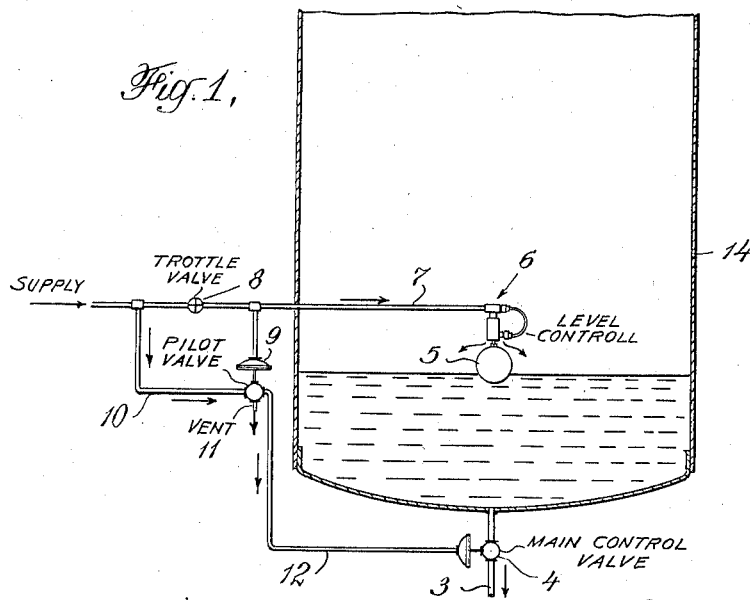
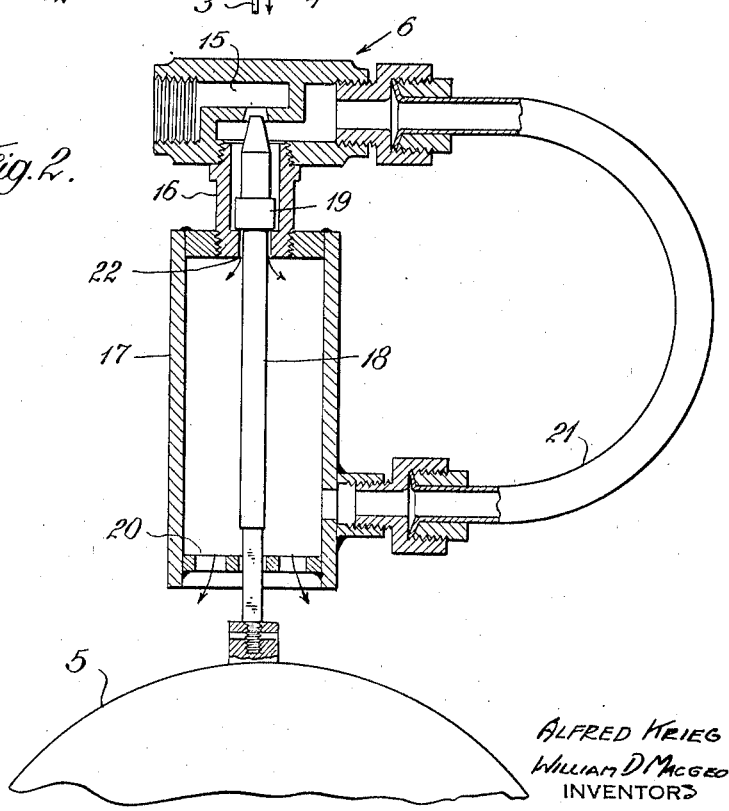
ALFRED KRIEG
WILLIAM D. MACGEORGE
INVENTORS
BY
ATTORNEY

UNITED STATES PATENT OFFICE 2,226,533

LEVEL CONTROL VALVE

Alfred Krieg, Woodbury, and William D. Macgeorge, Wenonah, N. J., assignors to Socony-Vacuum Oil Company, Incorporated, New York, N. Y., a corporation of New York Application April 30, 1938, Serial No. 205,188

1 Claim. (Cl. 137—104)

This invention has to do with liquid level control valves.

The object of the invention is to provide a means and method of controlling the level of liquid in relatively large tanks in which the valve controlling the withdrawal of liquid is automatically shut off or turned on. In particular, the object of this invention is to provide a novel and reliable means of such control of the class wherein the movement of a float actuated by the liquid serves to control a pilot valve through which flows a pressure fluid acting to control the main valve. A principal object is to provide a mechanism of such nature wherein the moving parts and orifices are protected from corrosion, gumming and clogging by the liquid whose level is controlled. A further object is the provision of such a mechanism of relatively low cost and capable of ready and economical maintenance.

The invention consists in the several features hereinafter described and more particularly defined in the claim appended hereto.

To enable ready understanding of the invention, reference is now made to the drawing attached hereto, in which Figure 1 shows, in somewhat schematic form, a vessel in which the level is controlled by the device, and in which Figure 2 shows, in partial section the actuating valve mechanism.

In Figure 1, 14 is a vessel containing liquid the level of which is to be controlled. Pipe 3 is for withdrawing liquid from vessel 14. 4 is a valve therein serving to control the amount withdrawn from 14 and hence the level therein. A float 5 is supported by the liquid and its height serves to actuate a control valve 6, the details of which are explained hereinafter. Actuating medium, which may be steam, compressed air, liquid of the same nature as that to be controlled, or any other fluid available under pressure and capable of being introduced into vessel 14 without derangement of the function thereof, is supplied through pipe 7. A fluid usually available and most conveniently so used is compressed air and the actuating medium will hereinafter be referred to as air, without, however, in any sense limiting the disclosure thereto. The supply of air to pipe 7 is controlled by a partially opened throttle valve 8. The pressure existing in pipe 7 is communicated to the actuating side of a pilot valve 9, which in turn supplies air from pipe 10 through pipe 12 to actuate valve 4. As will be noted later, when float 5 is below the desired level, control valve 6 is opened, and pressure may not build up in pipe 7, so valve 9 remains closed, and, since no air flows through pipe 12, valve 4 remains closed. When float 5 is above the desired level, control valve 6 closes, pressure builds up in pipe 7, valve 9 opens, pressure builds up in pipe 12, and valve 4 opens, lowering the liquid level and float 5. The usual small bleed vent 11 is provided in association with valve 9. Since valve 9 is, in effect, merely used as a relay, it is entirely practicable, in case the air pressure in pipe 7 may be high enough to utilize the diaphragm of valve 9 to directly operate valve 4.

Turning to Figure 2, the control valve 6 is found to consist of a valve 6, containing an orifice 15. From valve 6 there is dependent a sleeve 16, to which there is attached a guide chamber 17. Rod 18, attached to float 5, reciprocates vertically within 17 and 16, and is provided at its upper end with a tapered point seating in orifice 15, and serving to almost completely close said orifice. Rod 18 is likewise provided with an enlarged shoulder 19 to govern its travel in chamber 16. Alignment of rod 18 within 16 and 17 is achieved by shoulder 19, by a guide bar or bearing 20 at the lower end of 17, and by passage 22. Air passing to the low pressure side of valve 6 through orifice 16 is led through by-pass pipe 21 into the interior of guide chamber 17. A particularly important feature of this invention is the provision whereby the working parts are continuously bathed in a fluid of controlled nature and so protected from any corrosive, gumming, or other destructive or deranging action of the liquid in vessel 14. To provide this feature is the function of by-pass 21, as well as of the leakage insured by design of passage 22 to provide a loose fit. Obviously, when the level of liquid in 14 is correct or low, there is a continuous passage of sufficient air through port 15 to insure that the working portions of the control valve are continually bathed in air and protected from the medium stored in vessel 14. To insure continuance of this protection during periods of high level in vessel 14, the end of rod 18 is not provided with an accurate fit into orifice 15, so that even when it is forced into position, there is leakage sufficient to maintain flow of air through 21 and 22, the flow through 15, however, being enough less than the flow through valve 8 (Figure 1) so that actuating pressure is built up in pipe 7 to operate valve 9.

So far, air has been spoken of as the actuating medium. A most common use for a valve of this type is in controlling the level of liquid in an evaporator or other vessel in an oil cracking system, in which case the actuating medium would not be air, but would conveniently and preferably be an oil refractory under the conditions obtaining in the vessel 14. Under such circumstances, it is usually best to provide that pipe 10 should not be attached to the supply pipe, but should be attached to some source of an actuating fluid, such as compressed air, other than the oil flowing through the supply pipe.

We claim:

A liquid level responsive needle valve mechanism for controlling the pressure of an actuating fluid within a conduit comprising a valve having a high pressure and a low pressure chamber and an orifice therebetween, the high pressure chamber being connected to said conduit, a float actuated by said level, a rod connected to said float and extending into said valve, operating to close the orifice therein, a guide chamber around said rod constituting an extension of the low pressure chamber of the valve, a second guide chamber around said rod, constituting an open ended chamber and divided from said first chamber by a wall through which said rod passes, pipe means connecting the low pressure chamber with the interior of said second guide chamber.

ALFRED KRIEG.
WILLIAM D. MACGEORGE.